(12) United States Patent
Arya (10) Patent No.: US 9,210,132 B2
(45) Date of Patent: Dec. 8, 2015

(54) PROTECTING SUBSCRIBER INFORMATION FROM THIRD PARTIES

(71) Applicant: Cellco Partnership, Arlington, VA (US)

(72) Inventor: Siddhartha Kumar Arya, Cumming, GA (US)

(73) Assignee: Cellco Partnership, Basking Ridge, NJ (US)

( * ) Notice: Subject to any disclaimer, the term of this patent is extended or adjusted under 35 U.S.C. 154(b) by 68 days.

(21) Appl. No.: 13/930,314

(22) Filed: Jun. 28, 2013

(65) Prior Publication Data

US 2015/0006885 A1 Jan. 1, 2015

(51) Int. Cl.
*G06F 7/04* (2006.01)
*H04L 29/06* (2006.01)

(52) U.S. Cl.
CPC ................................ *H04L 63/0428* (2013.01)

(58) Field of Classification Search
CPC ............................... H04L 9/32; H04L 9/3236
USPC ..................................................... 726/26–30
See application file for complete search history.

(56) References Cited

U.S. PATENT DOCUMENTS

| | | | | |
|---|---|---|---|---|
| 2003/0126436 | A1* | 7/2003 | Greenberg et al. | 713/168 |
| 2007/0005955 | A1* | 1/2007 | Pyle et al. | 713/156 |
| 2008/0066182 | A1* | 3/2008 | Hickmott et al. | 726/26 |
| 2009/0187939 | A1* | 7/2009 | Lajoie | 725/34 |
| 2009/0199002 | A1* | 8/2009 | Erickson | 713/171 |
| 2009/0216847 | A1* | 8/2009 | Krishnaswamy et al. | 709/206 |
| 2010/0024036 | A1* | 1/2010 | Morozov et al. | 726/26 |
| 2010/0306048 | A1* | 12/2010 | Corduneanu et al. | 705/14.45 |
| 2011/0231913 | A1* | 9/2011 | Feng et al. | 726/7 |
| 2013/0275758 | A1* | 10/2013 | Marlow | 713/171 |

OTHER PUBLICATIONS

Fung et al. "Privacy-preserving data publishing: A survey of recent developments" ACM Computing Surveys, vol. 42, No. 4, Article 14, Publication date: Jun. 2010 pp. 14:1-14:53.*

* cited by examiner

*Primary Examiner* — Roderick Tolentino (57) ABSTRACT

A data warehouse and method of providing a record that includes both desired demographic information and undiscoverable individual information are described. Data records including subscriber-identifiable information associated with a device of a subscriber to the network service provider and demographic attributes associated with the network subscriber are initially extracted from the record. A hash value based on subscriber-identifiable information associated with the subscriber device is generated and used to generate a user identifier hash value based on the subscriber-identifiable information and a periodically-updated salt value. The record is updated to form a hashed record that includes the demographic attributes of the network subscriber, the hash value, and the user identifier hash value. The hashed record is then supplied in response to a request from a query server.

14 Claims, 5 Drawing Sheets

| Field | Data |
|---|---|
| Operation | 01 |
| MDN | 678-555-1212 |
| Demographics | English \| 1976 \| F \| 25k-50k |
| Opt Out | FALSE |
| Address | 123 Yellowstone |
| Zip | 55678 |

*116*

| Field | Data |
|---|---|
| Operation | 01 |
| Hashed MDN | grjsgfjksdjg4646%&^$&^ |
| Demographics | English \| 1976 \| F \| 25k-50k |
| Opt Out | FALSE |
| Address | 123 Yellowstone |
| Zip | 55678 |
| UIDH1 | NzM1MjA5OTAxACLt5+9T8XJpdttj9q¡Xup0IKq/FkBcYk169dWxcfhPq |
| UIDH2 | Yjhsdh^45+jkbjbgse/hjg&58564588f56g448gth48864586%4thgds |

PROTECTING SUBSCRIBER INFORMATION FROM THIRD PARTIES

BACKGROUND

Subscriber-identifiable information may include various elements of personal information about an individual or business that may be used by a third party to discover the identity of the subscriber. In some cases, a party may desire to send information to a third-party regarding its subscribers, but may be unable to do so because of the possibility of the third-party discovering the identities of the subscribers through the subscriber-identifiable information.

DETAILED DESCRIPTION

A system may be designed to protect information used to particularly identify subscribers (such as mobile dialed numbers), while enabling third parties, to make use of demographic attributes of the system data. As one example, the system may allow advertisers or advertising networks to use subscriber demographic attributes to define appropriate audiences for banner advertising campaigns or applicable content delivery. As another example, the system may allow third parties that do not require the particular identities of individuals to perform analytics of the subscriber data using demographics of the individuals, such as for use in analysis of census, hospital patient, travel or reservation data. To do so, the system may compile data records including demographic or other relevant information about the subscribers, while replacing the subscriber-identifiable information in the data records with periodically-updated user identifier hash (UIDH) values from which subscriber identify may not be readily determined.

For example, an advertising campaign may include targeting criteria identifying aspects of subscribers targeted for the campaign. A buyer of advertisements, such as an advertisement network or demand side platform, may load an advertising campaign and its associated targeting criteria onto an advertisement server. The advertisement server may be configured to provide the targeting criteria to a network service provider. The network service provider may be configured to identify a list of subscribers that match the targeting criteria, and to provide UIDH values associated with those subscribers back to the advertisement server.

When a subscriber request is received from a subscriber, the network service provider may be configured to add a UIDH value corresponding to the subscriber to the subscriber request. Upon receipt of a subscriber request, the advertising server may be configured to determine whether there is a match of the UIDH value provided in the request with a UIDH associated with an advertising campaign. If so, the advertiser server may provide an advertisement from the advertising campaign to the subscriber responsive to the request, if such an advertisement is available.

Accordingly, the UIDH values may be used to identify subscribers while at the same time securing the identity of the subscriber and minimizing the possibility for the UIDH values to be tracked back to a particular subscriber. To reduce the possibility of tracking of the UIDH values, the UIDH values may be changed from time to time, e.g., periodically such as weekly or monthly. Thus, advertisers may find audiences identified by the advertiser as interested in their products or services, and subscriber may receive higher quality and more targeted advertisements while at the same time maintaining their privacy from the advertisers.

Figure 1:
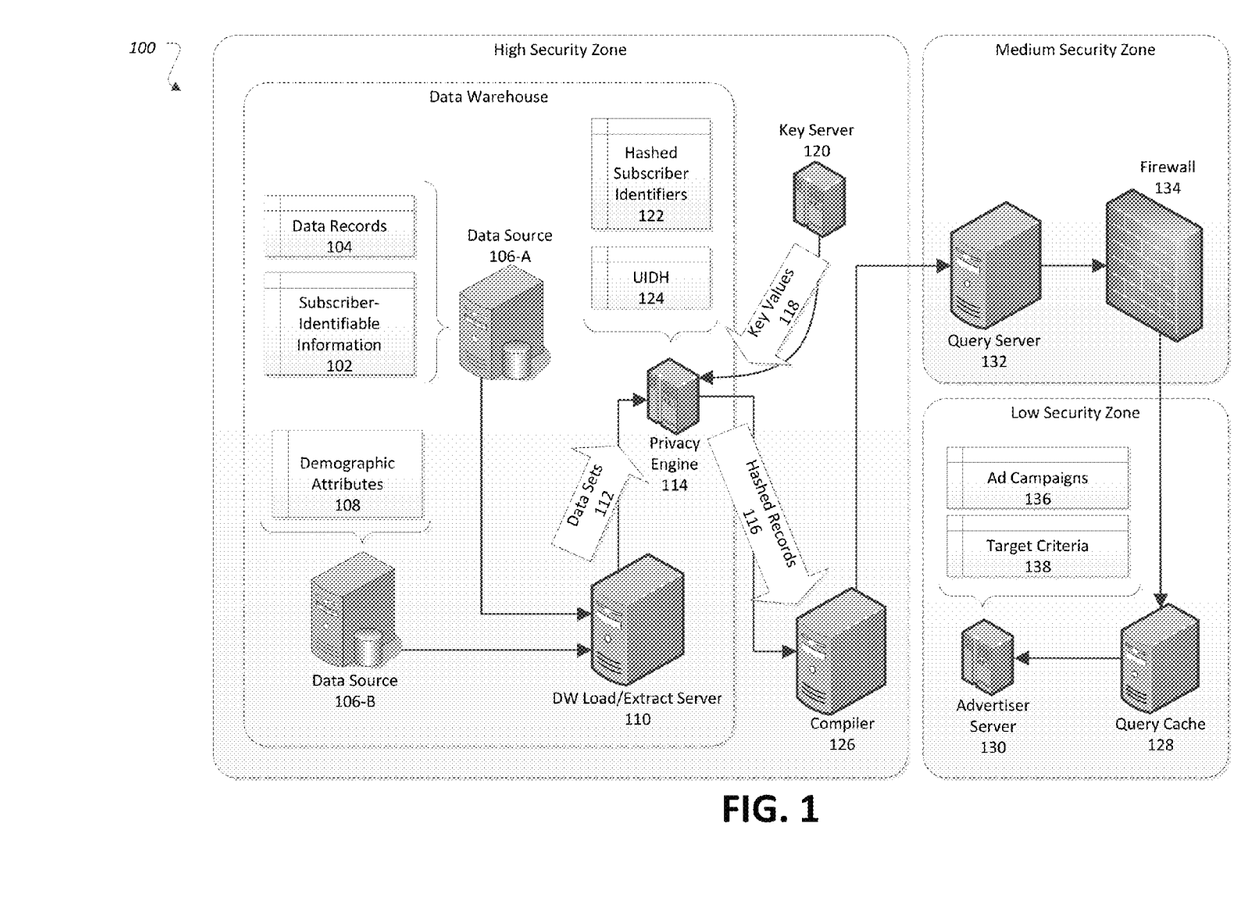
FIG. 1 illustrates an exemplary system for protecting subscriber-identifiable information from third parties.

FIG. 1 illustrates an exemplary system 100 for protecting subscriber-identifiable information from third parties. The system 100 may include one or more data sources 106 storing subscriber data records 104 including subscriber-identifiable information 102 and demographic attributes 108 of the subscribers. The system 100 may further include a data warehouse load/extract server 110 receiving the data records 104 and creating incremental data sets 112 to provide to a privacy engine 114. The privacy engine 114 may use rotating key values 118 received from a key server 120 acting as a key manager to replace the subscriber-identifiable information 102 with hashed subscriber identifiers 122 and UIDH 124 values. These records with replaced information may be referred to as hashed records 116. The system 100 may further include a compiler 126, which may process the hashed records 116 and push the hashed records 116 to a query cache 128 through a firewall 134 via query server 132, which may in turn push the data to specific advertising servers 130. The advertising servers 130 may store advertising campaigns 136 and associated targeting criteria 138 to match with the demographic attributes 108 of the subscribers. The system 100 may take many different forms and includes multiple and/or alternate components and facilities. While an exemplary system 100 is shown in FIG. 1, the exemplary components illustrated of the system 100 are not intended to be limiting. Indeed, additional or alternative components and/or implementations may be used.

The subscriber-identifiable information 102 may include various elements of personal information about an individual or business that may be used to identify and potentially communicate with a subscriber. Exemplary types of subscriber-identifiable information 102 may include mobile device numbers, e-mail addresses, Twitter handles, instant messaging accounts, social security numbers and driver's license numbers. It may be desirable for the subscriber and the network service provider to keep such subscriber-identifiable information 102 private from advertisers, to avoid advertisers contacting subscribers directly or maintaining databases of information including the subscriber-identifiable information 102.

The data records 104 may include information regarding subscribers (e.g., individuals, business) that may be generated or maintained in the ordinary course of business. Exemplary data records 104 may include information about subscribers of the system, such as subscriber-identifiable information 102 (e.g., MDN), an opt-in status indicative of whether the subscriber has assented to use of the advertising features of the system 100, information indicative of the capabilities of device hardware of the subscriber (e.g., device generation), and demographic attributes 108 relating to individuals such as the subscribers (e.g., age, sex, language preference, estimated income, etc.).

The data sources 106 may include one or more sources of data records 104. For example, a subscriber information data source 106-A may provide data records 104 related to subscriber identities, while a demographic attribute data source 106-B may provide data records 104 related to demographic attributes 108 of subscribers or other categories of individuals. The types of information available from the various data sources 106 may partially overlap or be entirely different. While two data sources 106 are shown in FIG. 1, systems 100 including more or fewer data sources 106 are possible. In some cases, multiple data sources 106 may include fields holding the same type or types of subscriber-identifiable information 102.

The data warehouse load/extract server 110 may be configured to receive data records 104 from the data sources 106. For example, the data warehouse load/extract server 110 may receive data records 104 or related files including subscriber-identifiable information 102 at a predetermined time of day, or during a certain time window or time period. The data warehouse load/extract server 110 may be further configured to extract subscriber data from the data records 104, such as the subscriber-identifiable information 102, the opt-in status of the subscriber, the information related to the model or capabilities of a subscriber device associated with the data record 104, and the demographic attributes 108 related to the subscriber.

In some cases, the data to include in the data records 104 may be joined from multiple data sources 106. As one example, MDN, subscriber name, address information, and opt-in information for a subscriber may be received from a data source 106 of subscriber information, while age, gender, and income information from a data source 106 of demographic attributes 108 may be joined to the subscriber information (e.g., according to subscriber name or address). In some cases, the demographic attributes 108 may be processed for inclusion in the data records 104. For instance, age range information to include in the data records 104 may be computed according to birthdate information included in a demographic attributes data source 106.

The data warehouse load/extract server 110 may be further configured to compare the extracted data to previously extracted data (e.g., data from a preceding time period), and create an incremental data set 112 of new, modified or removed data records based on the comparison rather than a complete set of all subscriber current records.

The incremental data sets 112 may be named according to the time period for which it is applicable. For example, a filename or other identifier of the incremental data set 112 may include date stamp and/or time stamp information indicative of when the incremental data set 112 was created. The date and time stamp information may also be useful for other purposes, such as verifying the order of incremental changes to be made to a data set. The structure of the incremental data set 112 may be of the form of a text file including a plurality of data fields delimited in various ways, such as with commas or bars, or may be in the form of a database table or other file type sufficient for transfer of the data records 104.

The contents of the incremental data set 112 may include various types of data, such as data columns including one or more of: subscriber-identifiable information 102, marketing information (e.g., information indicative of language preference, birth year, gender, estimated income, etc.), opt-in/opt-out status, and address and zip code information. The incremental data sets 112 may also include an operation flag data column that includes information indicative of a specific update action associated with the corresponding data record 104 (e.g., subscriber additions, updates, and removals). In some cases, the incremental data sets 112 may be sorted according to the operation flag data column to facilitate the updating of a data set of subscribers using the incremental data set 112 (e.g., perform all additions first, then all data updates, and then all data removals).

The privacy engine 114 may be configured to receive the incremental data sets 112 from the data warehouse load/extract server 110, and to perform operations on the data sets 112 to secure the subscriber-identifiable information 102. For instance, the privacy engine 114 may be configured to use rotating key values 118 received from a key server 120 to replace the clear-text subscriber-identifiable information 102 fields of the incremental data sets 112 with hashed subscriber identifiers 122 and UIDH 124 values. As mentioned above, the data records 104 with these replacements and changes may be referred to as hashed records 116.

In some cases, current UIDH 124 values based on current rotating key values 118 as well as previous UIDH 124 values based on previous rotating key values 118 may be included in the hashed records 116. The privacy engine 114 may be further configured to generate checksum files of the hashed records 116 that may be used by recipients of the hashed records 116 to ensure that the hashed records 116 are accurately transferred to the recipients. Further aspects of the generation of the hashed subscriber identifiers 122 are discussed below with respect to FIG. 2, and further aspects of the generation of the UIDH 124 values are discussed below with respect to FIG. 3.

The compiler 126 may be used in enabling the advertising server 130 to better target advertising banners delivered on network service provider subscriber devices when the subscriber devices visit content sites that enable such advertising. The compiler 126 may reside within a relatively high-security zone of the system 100, and in many cases may be owned or maintained by the network service provider. The compiler 126 may be configured to receive the hashed records 116 of the incremental data sets 112 from the privacy engine 114, and compile the hashed records 116 into an up-to-date listing of subscribers and associated information. The compiler 126 may be further configured to pass lists of UIDH 124 values and associated campaign identifiers to the query server 132, which may then, using a secure connection, pass the lists on to the query cache 128.

As the query cache 128 does not receive the subscriber-identifiable information 102, the query cache 128 may not be required to be housed in a location having the same high level of security as the elements of the system 100 that handle the subscriber-identifiable information 102. The query cache 128 may accordingly reside in a relatively lower security network zone to push the hashed records 116 to an advertiser server 130.

The advertiser server 130 may be configured to receive UIDH 124 values from the hashed records 116 for use in protecting the subscriber-identifiable information 102 from third-parties. One exemplary use of the UIDH 124 values may be for advertising campaigns 136. An advertising campaign 136 may include one or more advertisements to be displayed to subscribers, as well as targeting criteria 138 identifying demographic attributes 108 of subscribers targeted to receive the advertisements of the campaign 136. A buyer of advertisements, such as an advertisement network or demand side platform, may provide an advertising campaign 136 and its associated targeting criteria 138 onto the advertiser server 130. The advertiser server 130 may be configured to assign a campaign 136 identifier to the advertising campaign 136 and to provide the targeting criteria 138 and campaign 136 identifier to the query cache 128. The compiler 126 may be configured to identify a list of subscribers that match the targeting criteria 138, and to provide UIDH 124 values associated with those subscribers back to the advertiser server 130. Upon receipt of a subscriber request including a UIDH 124, the advertising server 130 may be configured to determine whether there is a match of the UIDH 124 with a UIDH 124 associated with an advertising campaign 136. If so, the advertiser server 130 may provide an advertisement of the matching advertising campaign 136 responsive to the subscriber request.

Thus, a buyer of advertisements may pre-load targeting criteria 138 on the system 100, and the system 100 may identifies relevant subscribers in advance. Once identified, the UIDH 124 values of the identified relevant subscribers matching the targeting criteria 138 may be loaded into a cache as a list consisting of the UIDH 124 values and identifiers of the campaigns, so that upon an advertisement request, the advertiser server 130 may have the information to identify whether a banner campaign is eligible for display.

Moreover, the UIDH 124 values may also be useful in other contexts other than advertising in which operations on data including subscriber-identifiable information 102 may be performed, but where the subscriber-identifiable information 102 should be protected from third parties. For example, the techniques discussed herein may be useful for systems that provide analytics using demographics of users but that do not require the particular identities of the users themselves, such as systems that perform analytics on census data, hospital patient data, travel or reservation data, etc. For instance, the system 100 may allow an operator to identify a set of male air travelers between the age group of 45-50 and earning at least $100 K/year for further processing as one possibility.

Figure 2:
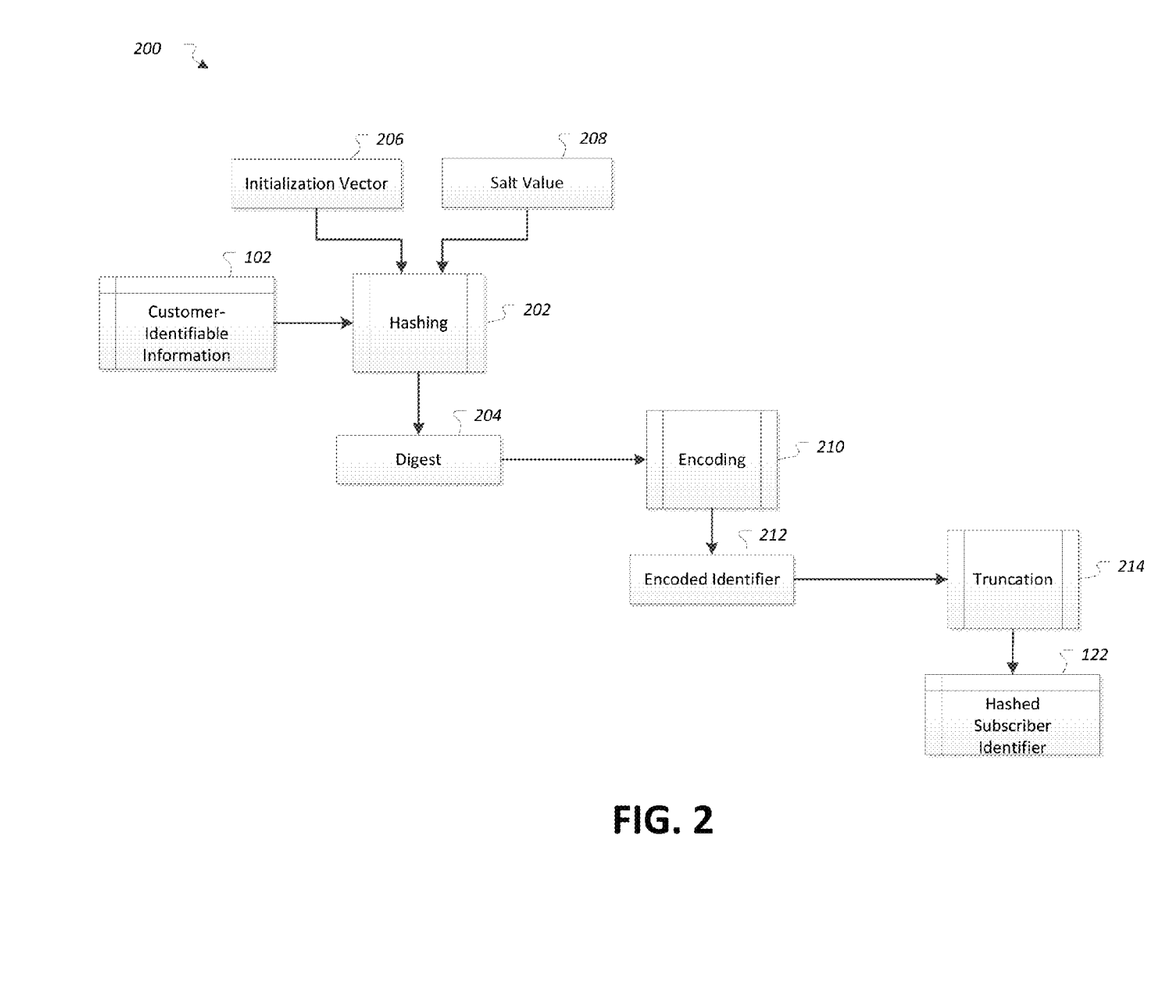
FIG. 2 illustrates an exemplary one-way encryption methodology for generating hashed subscriber identifiers to use in place of subscriber-identifiable information.

FIG. 2 illustrates an exemplary one-way encryption methodology 200 for generating hashed subscriber identifiers 122 to use in place of subscriber-identifiable information 102.

The one-way encryption methodology 200 may perform a hashing 202 using a cryptographic hashing function or procedure designed to obfuscate or otherwise encrypt input data using mathematical operations. The hashing 202 may be configured to receive an item of subscriber-identifiable information 102 (e.g., a ten digit MDN) and to provide an encrypted fixed-size bit string digest 204 from which the subscriber-identifiable information 102 may not be readily determined. An exemplary length of digest 204 suitable for use with ten digit MDNs may be 256 bits in length. The hashing 202 may be designed such that a small change in the input string produces a significantly different digest 204. In some cases, to seed the hashing 202, an initialization vector 206 may be utilized for the hashing 202 of the first item or items of subscriber-identifiable information 102. The initialization vector 206 may be determined, for example, by way of a random number generation.

The methodology 200 may further utilize a salt 208 value (e.g., random data used as an additional input to the hashing 202 algorithm) to further protect the hashed subscriber identifiers 122. The salt 208 value may remain relatively fixed as compared to the relatively dynamic nature of the UIDH 124 values, to facilitate consistent generation of the hashed subscriber identifiers 122 across multiple UIDH 124 periods or cycles. The salt 208 value remaining fixed means that the hash digest 204 produced will remain constant until the salt 208 is changed. For example, a salt 208 value of "phHqefwopL7XBwzF0H8ayfv2Yva+135sIL8" may produce a digest 204 of "i80kQbGw4scSrwrzGVs" for an MDN of 1234567809 (e.g., the subscriber-identifier information 102), regardless of when the digest 204 is determined. So, as long as the value of the salt 208 remains unchanged, the digest 204 for the subscriber-identifier information 102 may remain constant.

The methodology 200 may further perform an encoding 210 of the digest 204 to translate the binary digest 204 into an encoded identifier 212. The encoded identifier 212 may encode binary digest 204 value into textual or other readable characters that may be more easily stored and transmitted (e.g., into a textual string). An exemplary encoding 210 procedure may be the base 64 algorithm used for encoding of e-mail attachments, but other encodings 210 may be utilized. In a base 64 encoding using the exemplary 256-bit identifiers, the encoding 210 would produce a 43 character encoded identifier 212 string representing all 256 bits, where the first 42 bytes of characters each represent six bits of the binary digest 204, and the last character represents the remaining four bits.

Although a 256-bit string may not appear to be large, systems may store terabytes of data records 104 including hashed digests 204. Thus, the storage requirements for the digest 204 may be significant. An algorithm that produces smaller hash values than 256-bit value may save storage, but at the expense of decreased security of the encrypted subscriber-identifiable information 102. To allow smaller resultant hashed subscriber identifiers 122 without affecting security, the methodology 200 may perform a truncation 214 of a more lengthy encoded identifier 212 (e.g., the exemplary 256-bit identifier) to produce the hashed subscriber identifiers 122. (In some cases, different lossy operations may be performed instead of or in addition to truncation 214 to create the hashed subscriber identifier 122.) Since the hashed subscriber identifier 122 does not contain the entire encrypted value, it would be extremely difficult for a hashed subscriber identifier 122 to be reversed back into the original subscriber-identifiable information 102. Thus, security of the subscriber-identifiable information 102 would not be compromised, and in fact may be enhanced.

Rather than decreasing security, however, a potential concern for use of truncation 218 on the hashed subscriber identifiers 122 is collisions, where a hashed subscriber identifier 122 may ambiguously be computed from more than one element of subscriber-identifiable information 102. Nevertheless, this collision risk may be mitigated by including enough bits of the encoded identifier 212 in the hashed subscriber identifier 122 to make such a collision highly unlikely. As an example, utilizing the first 90 bits of a 256-bit encoded identifier 212 may provide for good security while at the same time avoiding the likelihood of subscriber-identifiable information 102 collisions in the hashed subscriber identifier 122 values.

Figure 3:
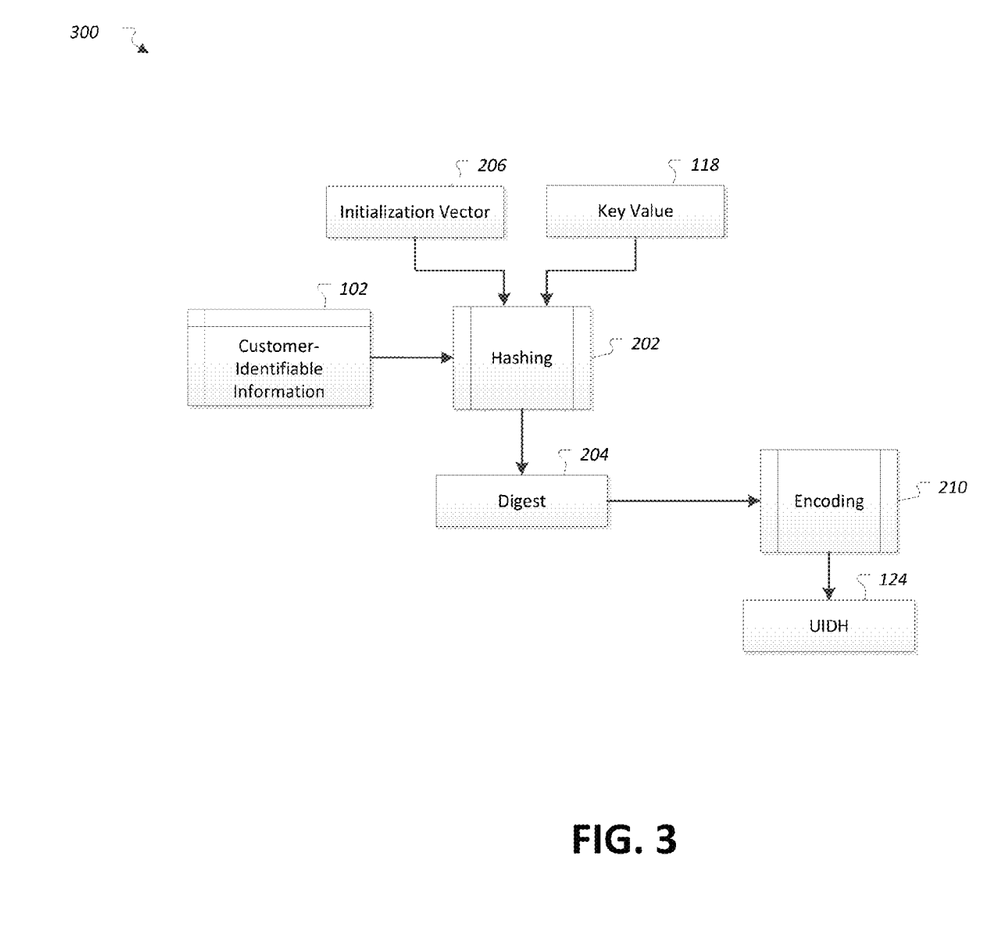
FIG. 3 illustrates an exemplary encryption methodology for generating user identifier hash values to use in place of subscriber-identifiable information.

FIG. 3 illustrates an exemplary one-way encryption methodology 300 for generating UIDH 124 values to use in place of subscriber-identifiable information 102. Similar to the methodology 200, the methodology 300 may perform a hashing 202 of an item of subscriber-identifiable information 102 to provide an encrypted fixed-size bit string digest 204 from which the subscriber-identifiable information 102 may not be readily determined. Also similar to the methodology 200, the methodology 300 may seed the hashing 202 with an initialization vector 206.

In contrast to the salt 208 value that may remain relatively fixed to facilitate consistent generation of the hashed subscriber identifiers 122 across multiple UIDH 124 periods or cycles, the methodology 300 may utilize a rotating key value 118. For instance, the rotating key value 118 may be a random number or other value generated periodically by the key server 120. As a specific example, a rotating key value 118 of "1330058155" may be received from the key server 120 for use in generating user identifier hash values associated with a first time period. For example, the first rotating key value 118 may produce a digest 204 of "MTY0NzY0ODI4MQCK/YbpnqpKUuSzYczpm5LCaINLbZNP/FjNxh8YsFyQFg=" for an MDN of 1234567809 (e.g., the subscriber-identifier information 102). A second rotating key value 118 of "1330058155" may be received from the key server 120 and may be for use in generating user identifier hash values associated with a second time period. For instance, a second generation of a digest 204 for the same subscriber-identifier information 102 using the second rotating key value 118 may result in a different digest 204 value of MTcxMjc0ODc1OQBphHqefwopL7XBwzF0H8ayfv2Yva+135sIL8Re51KkjA==". As one example of the relatively fixed nature of the salt 208 as compared to the generation of UIDH 124 values, the salt 208 may be updated every six months, while the UIDH 124 values may be generated using a key value 118 that change weekly.

Use of a rotating key value 118 may affect the resultant output such that UIDH 124 values generated with different key values 118 are very difficult to identify as being generated from the same subscriber-identifiable information 102. By doing so, UIDH 124 values may be useful only for substantially the period of use of the current rotating key value 118, as one the rotating key value 118 is changed, the UIDH 124 values will be generated differently. Similar to the methodology 200, the methodology 300 may further perform an encoding 210 of the resultant digest 204, but in the methodology 300, the resultant value may be referred to as a UIDH 124.

Figure 4:
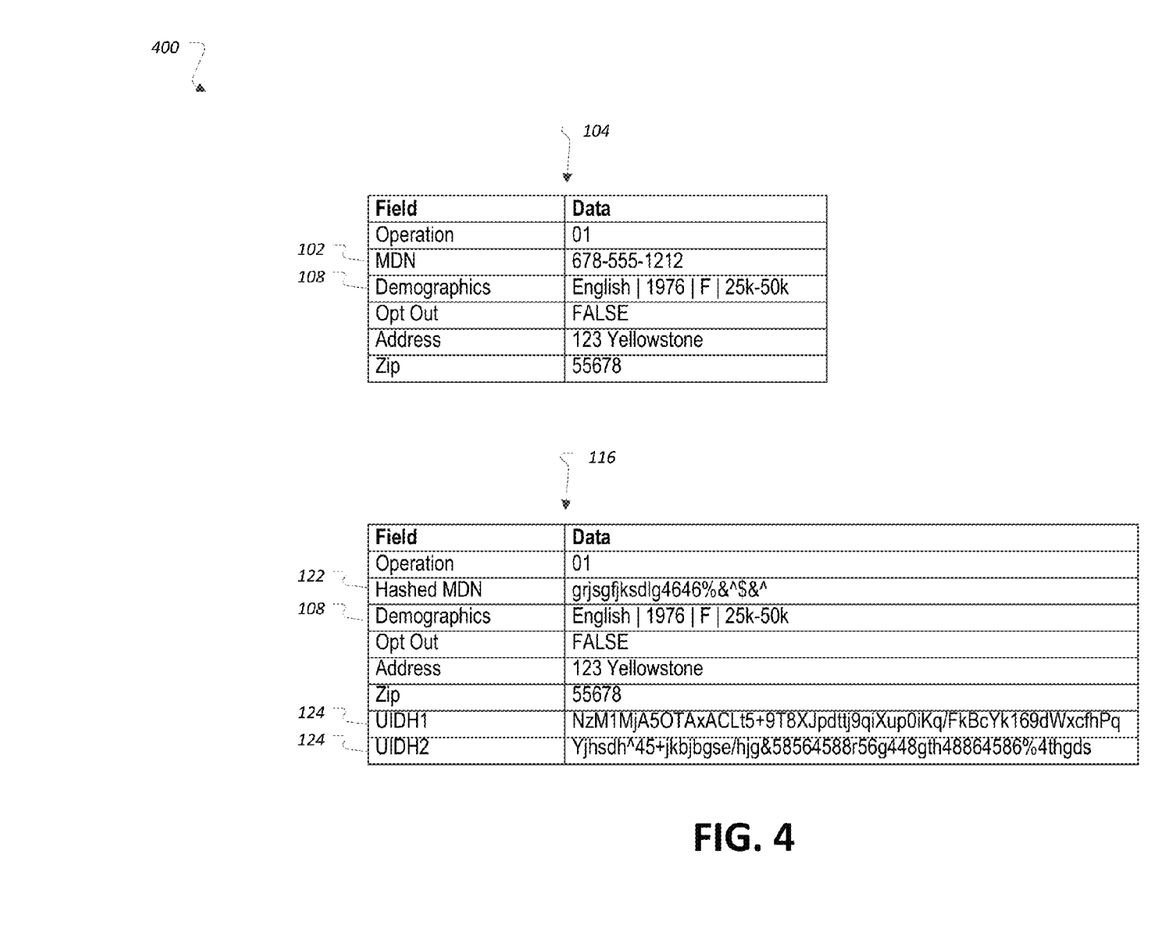
FIG. 4 illustrates an exemplary conversion of a data record of a data set into a hashed record protecting the subscriber-identifiable information.

FIG. 4 illustrates an exemplary conversion 400 of a data record 104 of a data set 112 into a hashed record 116 protecting the subscriber-identifiable information 102. The conversion 400 may be performed, for example, by a privacy engine 114 receiving data sets 112 including data records 104 from one or more data sources 106, the data records 104 including subscriber-identifiable information 102. As shown, the data record 104 includes subscriber-identifiable information 102 in the form of a MDN of the subscriber. The data record 104 may also include additional information, such as whether the subscriber is opted into or out of use of the system 100, address information for the subscriber, and a data operation to perform using the hashed record 116 once it is processed.

The data record 104 may also include demographic attributes 108 of the subscriber that may be used to match the subscriber to targeting criteria identifying aspects of subscribers targeted for advertising campaigns 136. As illustrated in the example, the demographic attributes 108 include preferred language, birth year, gender, and income range, respectively. It should be noted that the particular illustrated demographic attributes 108 are only exemplary, and more, fewer, or different demographic attributes 108 may be utilized. Other formats of demographic attributes 108 are also possible, such as separate fields for different data elements or different delimiters or encodings of the included information.

To protect the privacy of the subscriber, while still allowing targeted advertising campaigns 136 based on demographic attributes 108 of the subscriber, subscriber-identifiable information 102 may be removed from the data sets 112 and replaced with data from which the subscriber identity may not be determined. For instance, the MDN of the illustrated data record 104 may be replaced with a hashed subscriber identifier 122, generated using a process such as the one-way encryption methodology 200 discussed in detail above. Moreover, a UIDH 124 value may additionally be added to the data record 104, generated using a process such as the one-way encryption methodology 300 discussed in detail above.

The hashed subscriber identifier 122 may be relatively constant, and therefore may facilitate unique identification of the subscriber within the data warehouse and query server 132 without giving away the subscriber's identity. For example, if a subscriber decides to opt out of use of the system 100 after having previously opted in, in order to remove all records for the subscriber (including records that include the hashed subscriber identifier 122 but not the subscriber-identifiable information 102), the hashed subscriber identifier 122 may be used as an identifier in a query to match and remove all such records related to a subscriber's identity, regardless of the current UIDH 124 value.

The UIDH 124 value may be periodically updated due to updating of the rotating key value 118 received from the key server 120, and thus may be more secure to use for operations external from the data warehouse. For example, the advertising server 130 may be configured to rely on UIDH 124 to facilitate secure identification of the subscriber, while still protecting the subscriber's identity.

In some examples, both the current UIDH 124 value and also a previously generated UIDH 124 value may be included in the hashed record 116. Inclusion of both the current UIDH 124 value and also the previously generated UIDH 124 may allow for the matching of subscribers to advertising campaigns 136 in cases where updating of the rotating key value 118 is not completely synchronized between network devices. For example, if a periodic update of a key value 118 used for generation of UIDH 124 values by a network switch through which received subscriber requests may pass is not completely synchronized with a key value 118 used by the privacy engine 114 (i.e., the network switch may be temporarily using an outdated key value 118), the previous UIDH 124 may also be used to attempt to match the UIDH 124 included in the subscriber request to an advertising campaign 136 by the advertising server 130. Thus, inclusion of both the current UIDH 124 and previous UIDH 124 in the hashed record 116 allows for a level of decoupling of the update time of the rotating key value 118 for different elements of the system 100.

Figure 5:
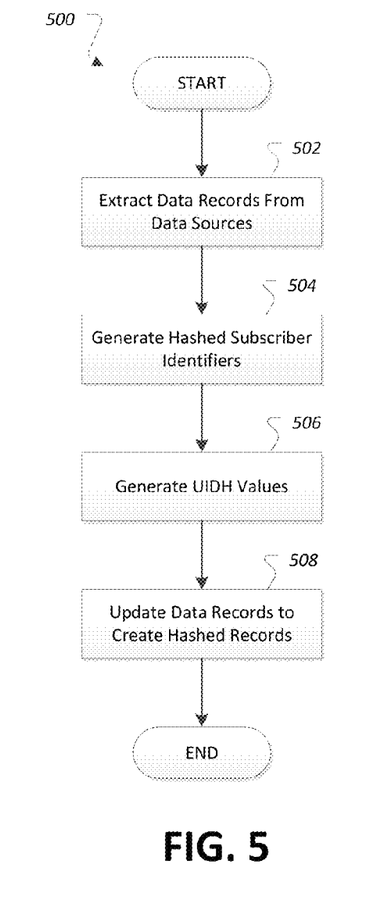
FIG. 5 illustrates an exemplary process for generation of hashed records from data records to protect subscriber-identifiable information for mobile advertisement.

FIG. 5 illustrates an exemplary process 500 for generation of hashed records 116 from data records 104 to protect subscriber-identifiable information 102 for mobile advertisement. The process 500 may be performed by various devices, such as including one or more devices of the data warehouse of the system 100.

In block 502, the data warehouse extracts data records 104 from data sources 106. For example, a privacy engine 114 of the data warehouse may receive subscriber information data records 104 in a data feed 112 generated by a data warehouse load/extract server 110. The data feed 112 may include data records 104 including information subscriber-identifiable information 102, such as MDNs of the subscribers. The data records 104 may further include information relating to subscriber accounts from a subscriber information data source 106, and information related to demographic attributes 108 of the subscribers from a demographic attribute data source 106.

In block 504, the data warehouse generates hashed subscriber identifiers 122. For example, the privacy engine 114 may generate the hashed subscriber identifiers 122 from the subscriber-identifiable information 102 according to the one-way encryption methodology 200 discussed in detail above in FIG. 2.

In block 506, the data warehouse generates UIDH 124 values. For example, the privacy engine 114 may generate the UIDH 124 from the subscriber-identifiable information 102 according to the one-way encryption methodology 300 discussed in detail above in FIG. 3.

In block 508, the data warehouse updates data records 104 to create hashed records 116. For example, the privacy engine 114 may update the data records 104 into the hashed records 116 as discussed in detail above in FIG. 4. The hashed records 116 may then be provided to the query cache 128 via query server 132, for use in advertising campaigns 136. After block 508, the process 500 ends.

Figure 6:
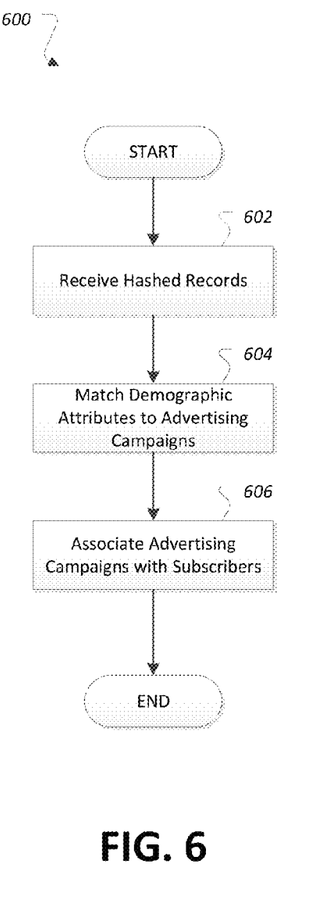
FIG. 6 illustrates an exemplary process for securely associating subscribers with advertising campaigns.

FIG. 6 illustrates an exemplary process 600 for securely associating subscribers with advertising campaigns 136. The process 600 may be performed by various devices, such as by one or more of a query cache 128, query server 132, and advertising server 130 in combination with other components of the system 100.

In block 602, the advertising server 130 receives hashed records 116. For example, the advertising server 130 may receive a feed including hashed records 116 from the privacy engine 114. As another example, the query cache 128 or query server 132 may receive the feed of hashed records 116 from the privacy engine 114, and may make them available for querying by the advertising server 130.

In block 604, the advertising server 130 matches demographic attributes 108 of subscribers to targeting criteria 138 of advertising campaigns 136. For example, the advertising server 130 may send a query to the query cache 128 including targeting criteria 138 of advertising campaigns 136, and may receive a listing of matching UIDH 124 values (e.g., determined by the compiler 126). In other examples, the advertising server 130 may identify which records in the hashed records 116 correspond to subscribers having demographic attributes 108 that match targeting criteria 138 of advertising campaigns 136.

In block 606, the advertising server 130 associates advertising campaigns 136 with the subscribers. For example, the advertising server 130 may maintain UIDH 124 values for subscribers having matching demographic attribute 108 in a listing of possible recipients of advertisements included in the matching advertising campaigns 136. In cases in which the hashed records 116 include multiple UIDH 124 values (e.g., a current UIDH 124 and a previous UIDH 124), both UIDH 124 values may be associated with the advertising campaigns 136 of matching subscribers. After block 606, the process 600 ends.

Figure 7:
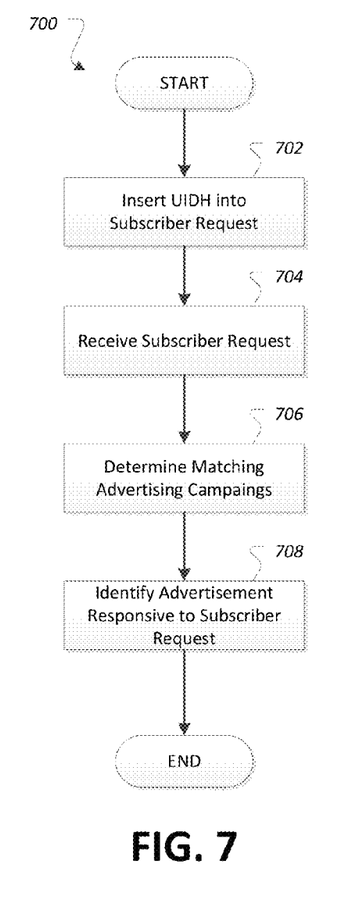
FIG. 7 illustrates an exemplary process for providing an advertisement responsive to a subscriber request.

FIG. 7 illustrates an exemplary process 700 for providing an advertisement responsive to a subscriber request. The process 600 may be performed by various devices, such as by the advertising server 130 of the system 100.

In block 702, the network inserts a UIDH 124 into a subscriber request. For example, a network switch through which the subscriber request may pass may insert the UIDH 124 into the subscriber request. The UIDH 124 may be computed, e.g., using a process such as the one-way encryption methodology 300 discussed above, upon receipt of the subscriber request. Or the UIDH 124 may be retrieved from a lookup of UIDH 124 values previously determined by the switch or other element of the network. In an example of an HTTP subscriber request, the UIDH 124 may be included in the URL of the request, such as by being appended to the subscriber request.

In block 704, the advertising server 130 receives the subscriber request. For example, the advertising server 130 may receive the subscriber request directly or indirectly from the network switch. The subscriber request may include UIDH 124 associated with the subscriber sending the request.

In block 706, the advertising server 130 determines matching advertising campaigns 136 based on the subscriber request. For example, the advertising server 130 may identify the UIDH 124 of the subscriber request, and may identify any advertising campaigns 136 associated with the identified UIDH 124. In some cases one or more advertising campaigns 136 may be associated with the UIDH 124, which in other cases no advertising campaigns 136 may match the UIDH 124.

In block 708, the advertising server 130 identifies an advertisement for the subscriber responsive to the subscriber request. The identified advertisement may be identified as being an advertisement of an advertising campaign 136 that matches the UIDH 124 of the subscriber sending the subscriber request. In cases where no advertising campaign 136 matches the request, a default advertisement may be provided without considering the specific identity of the subscriber. The identified advertisement may then be provided to the subscriber. After block 708, the process 700 ends.

Thus, through use of the system 100, third parties such as advertisers may use subscriber demographic attributes 108 to define appropriate audiences for banner advertising campaigns 136 or applicable content delivery (or to perform data analytics), while at the same time protecting subscriber-identifiable information 102 used to particularly identify subscribers (such as MDNs) that the subscribers may wish to keep private from the third parties.

In general, computing systems and/or devices, such the privacy engine 114, key server 120, query cache 128, and advertising server 130, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices generally include computer-executable instructions, where the instructions may be executable by one or more processors. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The functionality of the privacy engine 114 and advertising server 130 may include such computer program products. In some example, one or more of the privacy engine 114 and advertising server 130 may be provided as software that when executed by the processor provides the operations described herein. Alternatively, one or more of the privacy engine 114 and advertising server 130 may be provided as hardware or firmware, or combinations of software, hardware and/or firmware. Although one example of the modularization of the data warehouse and overall system 100 is illustrated and described, it should be understood that the operations thereof may be provided by fewer, greater, or differently named modules.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
 a data warehouse of a network service provider including at least one computing device configured to execute instructions on a processor of the computing device to cause the data warehouse to perform operations comprising:
  receiving data records including subscriber-identifiable information associated with a network subscriber to the network service provider and demographic attributes associated with the network subscriber;
  extracting the subscriber-identifiable information and the demographic attributes;
  generating a user identifier hash value based on the subscriber-identifiable information and a periodically-updated salt value; and
  providing a hashed record to a query server, the hashed record including the demographic attributes of the network subscriber and the user identifier hash value;
  generating user identifier hash values for a first time period using the periodically-updated salt value;
  receiving a second periodically-updated salt value from a key manager for use in generating user identifier hash values associated with a second time period;
  generating a second user identifier hash value based on the subscriber-identifiable information and the second periodically-updated salt value; and
  providing an updated hashed record to the query server including the demographic attributes of the network subscriber and the second user identifier hash value.

2. The system of claim 1, wherein the subscriber-identifiable information is associated with a subscriber device of the subscriber.

3. The system of claim 1, wherein the data warehouse is further configured to
 provide operations comprising:
  generating a partial hash value based on the subscriber-identifiable information, the partial hash value remaining constant across multiple periodically-updated salt values; and
  including the partial hash value in the hashed record.

4. The system of claim 1, further comprising:
a first data source configured to provide subscriber-identifiable information associated with subscriber devices connected to the network service provider; and
a second data source configured to provide demographic attributes of subscribers to the network service provider.

5. The system of claim 1, further comprising a key manager configured to periodically update the salt value, receive a query from the server requesting the salt value, and provide the salt value responsive to the query.

6. The system of claim 1, wherein the data warehouse is further configured to provide operations comprising including the user identifier hash value and the second user identifier hash value in the updated hashed record to allow for matching of either of the user identifier hash value and the second user identifier hash value.

7. The system of claim 1, wherein the data warehouse is further configured to provide operations comprising performing the one-way secured encryption by performing a hash of the subscriber-identifiable information into digests with a fixed salt value, encoding the digests into text strings, and further applying a truncation to the text strings to create the partial hash value, thereby protecting the privacy of the subscriber-identifiable information.

8. The system of claim 7, wherein the subscriber-identifiable information includes mobile device numbers, the digests are 256 bits in length, and wherein the hash generates encrypted identifiers and the truncation creates re-encrypted identifiers using the first 90 bits of the encrypted identifiers.

9. A method, comprising:
receiving data records including subscriber-identifiable information associated with a network subscriber to a network service provider and demographic attributes associated with the network subscriber;
extracting the subscriber-identifiable information and the demographic attributes;
generating, by a privacy engine of the network service provider, a user identifier hash value based on the subscriber-identifiable information and a periodically-updated salt value;
providing a hashed record by the privacy engine to a query server, the hashed record including the demographic attributes of the network subscriber and the user identifier hash value;
generating user identifier hash values for a first time period using the periodically-updated salt value;
receiving a second periodically-updated salt value from a key manager for use in generating user identifier hash values associated with a second time period;
generating a second user identifier hash value based on the subscriber-identifiable information and the second periodically-updated salt value; and
providing an updated hashed record to the query server including the demographic attributes of the network subscriber and the second user identifier hash value.

10. The method of claim 9, further comprising at least one of:
receiving, from a first data source, subscriber-identifiable information associated with subscriber devices connected to the network service provider;
receiving, from a second data source, demographic attributes of subscribers to the network service provider; and
receiving a periodically updated salt value from a key server.

11. The method of claim 9, further comprising including the user identifier hash value and the second user identifier hash value in the updated hashed record to allow for matching of either of the user identifier hash value and the second user identifier hash value.

12. A non-transitory computer readable medium storing a program, the program being executable by a processor of a computing device to provide operations comprising:
receiving data records including subscriber-identifiable information associated with a network subscriber to a network service provider and demographic attributes associated with the network subscriber;
extracting the subscriber-identifiable information and the demographic attributes;
generating a user identifier hash value based on the subscriber-identifiable information and a periodically-updated salt value;
providing a hashed record to a query server, the hashed record including the demographic attributes of the network subscriber and the user identifier hash value;
generating user identifier hash values for a first time period using the periodically-updated salt value;
receiving a second periodically-updated salt value from a key manager for use in generating user identifier hash values associated with a second time period;
generating a second user identifier hash value based on the subscriber-identifiable information and the second periodically-updated salt value; and
providing an updated hashed record to the query server including the demographic attributes of the network subscriber and the second user identifier hash value.

13. The non-transitory computer readable medium of claim 12, further providing for operations comprising at least one of:
receiving, from a first data source, subscriber-identifiable information associated with subscriber devices connected to the network service provider;
receiving, from a second data source, demographic attributes of subscribers to the network service provider; and
receiving a periodically updated salt value from a key server.

14. The non-transitory computer readable medium of claim 12, further providing for operations comprising including the user identifier hash value and the second user identifier hash value in the updated hashed record to allow for matching of either of the user identifier hash value and the second user identifier hash value.

* * * * *